(12) United States Patent
Chen et al.

(10) Patent No.: US 11,544,583 B2
(45) Date of Patent: Jan. 3, 2023

(54) METHOD FOR GENDER RECOGNITION OF USER AND RELATED PRODUCTS

(71) Applicant: GUANGDONG OPPO MOBILE TELECOMMUNICATIONS CORP., LTD., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 366 days.

(21) Appl. No.: 15/931,033

(22) Filed: May 13, 2020

(65) Prior Publication Data

US 2020/0327428 A1  Oct. 15, 2020

Related U.S. Application Data

(63) Continuation of application No. PCT/CN2018/115538, filed on Nov. 15, 2018.

(30) Foreign Application Priority Data

Dec. 6, 2017  (CN) .......................... 201711278336.4

(51) Int. Cl.
*G06F 17/18* (2006.01)
*G06N 5/04* (2006.01)
(Continued)

(52) U.S. Cl.
CPC .............. *G06N 5/04* (2013.01); *G06F 17/18* (2013.01); *G06N 5/02* (2013.01); *G06Q 30/0201* (2013.01); *H04W 88/02* (2013.01)

(58) Field of Classification Search
CPC .......... G06N 5/003; G06N 5/006; G06N 5/02; G06N 5/022; G06N 5/025; G06F 16/30;
(Continued)

(56) References Cited

U.S. PATENT DOCUMENTS

2006/0173556 A1   8/2006  Rosenberg
2007/0016626 A1*  1/2007  Castaneda ............... G06F 16/27
(Continued)

FOREIGN PATENT DOCUMENTS

CN   102708497 A   10/2012
CN   103530540 A    1/2014
(Continued)

OTHER PUBLICATIONS

International search report issued in corresponding international application No. PCT/CN2018/115538 dated Feb. 19, 2019.
(Continued)

*Primary Examiner* — Bo Hui A Zhu
(74) *Attorney, Agent, or Firm* — Young Basile Hanlon & MacFarlane, P.C.

(57) ABSTRACT

A method for gender recognition of a user and related products are provided. The method includes the following. A sever receives user characteristic data from a mobile terminal, where the user characteristic data is indicative of usage of the mobile terminal by the user. At least one user characteristic data sample matching the user characteristic data is determined from a predetermined set of user characteristic data samples. At least one reference gender corresponding to the at least one user characteristic data sample is obtained by querying a preset correspondence between user characteristic data samples and reference genders. Gender of the user is determined according to the at least one reference gender and the gender determined is sent to the mobile terminal.

9 Claims, 6 Drawing Sheets

(51) Int. Cl.
*G06N 5/02* (2006.01)
*G06Q 30/02* (2012.01)
*H04W 88/02* (2009.01)

(58) Field of Classification Search
CPC ...... G06F 16/33; G06F 16/335; G06F 16/337;
G06F 16/35; G06F 16/353; G06F 16/38;
G06F 16/43; G06F 16/436; G06F 16/903;
G06F 16/9035; G06F 17/17; G06F 17/18
See application file for complete search history.

(56) References Cited

U.S. PATENT DOCUMENTS

| | | | |
|---|---|---|---|
| 2017/0032180 A1* | 2/2017 | Zhang | G06V 20/30 |
| 2018/0349583 A1* | 12/2018 | Turgeman | H04L 63/0861 |

FOREIGN PATENT DOCUMENTS

| | | | |
|---|---|---|---|
| CN | 103546789 A | 1/2014 | |
| CN | 103729785 A | 4/2014 | |
| CN | 104090888 A | 10/2014 | |
| CN | 104636504 A | 5/2015 | |
| CN | 106371750 A | 2/2017 | |
| CN | 106447374 A | 2/2017 | |
| CN | 106897369 A | 6/2017 | |
| WO | 2017107422 A1 | 6/2017 | |

OTHER PUBLICATIONS

Chinese Third Office Action with English Translation for CN Application 201711278336.4 dated Dec. 29, 2021. (16 pages).
Communication pursuant to Article 94(3) EPC for EP Application 18886304.7 dated Feb. 18, 2022. (6 pages).
Chinese Second Office Action with English Translation for CN Application 201711278336.4 dated Jun. 4, 2021. (20 pages).
Indian Examination Report for IN Application 202017021941 dated Jun. 30, 2021. (8 pages).
Extended European search report issued in corresponding European application No. 18886304.7 dated Aug. 27, 2020.
First office action with English Translation issued in corresponding CN application No. 201711278336.4 dated Sep. 29, 2020.
Tang Wei et al: "Web Log User Identification Based on Behavior Analysis", dated Nov. 10, 2013; Software Industry and Engineering; pp. 53-56 with English Translation.
Chinese Office Action with English Translation for CN Application 201711278336.4 dated May 18, 2022. (19 pages).

* cited by examiner

METHOD FOR GENDER RECOGNITION OF USER AND RELATED PRODUCTS

CROSS-REFERENCE TO RELATED APPLICATION(S)

This application is a continuation of International Patent Application No. PCT/CN2018/115538, filed on Nov. 15, 2018, which claims priority to Chinese Patent Application No. 201711278336.4, filed on Dec. 6, 2017, the entire disclosure of both of which are hereby incorporated by reference in their entireties.

TECHNICAL FIELD

This disclosure relates to the technical field of mobile terminals, and particularly to a method for gender recognition of a user and related products.

BACKGROUND

With the rapid development of technologies relating to smart phones, an increasing number of applications are installed in mobile phones of users, such as reading applications, payment applications, game applications, music applications, etc. People's daily life is closely linked with the mobile phone.

SUMMARY

Implementations of the disclosure provide a method for gender recognition of a user and related products.

According to a first aspect, a method for gender recognition of a user is provided in implementations. The method is performed by a sever and the method includes the following. User characteristic data is received from a mobile terminal, where the user characteristic data is indicative of usage of the mobile terminal by the user. At least one user characteristic data sample matching the user characteristic data is determined from a predetermined set of user characteristic data samples. At least one reference gender corresponding to the at least one user characteristic data sample is obtained by querying a preset correspondence between user characteristic data samples and reference genders. Gender of the user is determined according to the at least one reference gender, and the gender of the user determined is sent to the mobile terminal.

According to a second aspect, a sever is provided. The sever includes a processor, a memory, a communication interface, and one or more programs stored in the memory and configured to be executed by the processor. The one or more programs include instructions for performing the method in the first aspect of the disclosure.

According to a third aspect, a non-transitory computer readable storage medium is provided. The non-transitory computer readable storage medium is configured to store computer programs for electronic data interchange. The computer programs, when executed by a computer, are operable with the computer to execute all or part of the operations described in the first aspect of the disclosure.

BRIEF DESCRIPTION OF THE DRAWINGS

The following briefly introduces accompanying drawings required for illustrating the implementations.

DETAILED DESCRIPTION

Figure 1:
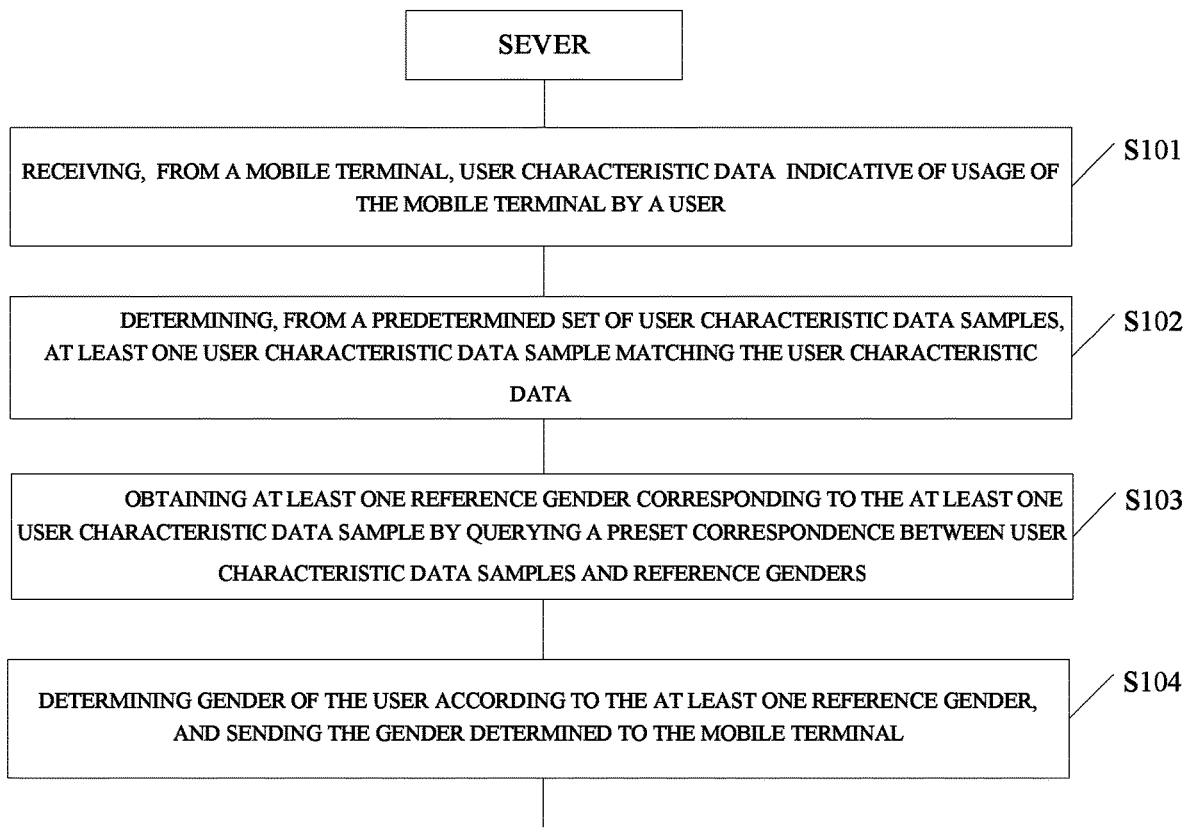
FIG. 1 is a schematic flow chart illustrating a method for gender recognition of a user according to implementations.

In order for those skilled in the art to better understand technical solutions, in the following, technical solutions of implementations will be described clearly and completely with reference to accompanying drawings in implementations. Apparently, implementations described hereinafter are merely some rather than all implementations. All other implementations obtained by those of ordinary skilled in the art based on implementations without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended for non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Mobile terminals in implementations of the disclosure may include various handheld devices, in-vehicle devices, wearable devices, computing devices that have wireless communication functions or other processing devices connected to a wireless modem, as well as various forms of user equipment (UE), mobile stations (MS), terminal devices, and the like. For the convenience of description, the above-mentioned devices are collectively referred to as mobile terminals. An operating system involved in implementations is a software system for unified management of hardware resources and provides service interfaces to users.

According to a first aspect, a method for gender recognition of a user is provided in implementations. The method is performed by a sever and the method includes the following. User characteristic data is received from a mobile terminal, where the user characteristic data is indicative of usage of the mobile terminal by the user. At least one user characteristic data sample matching the user characteristic data is determined from a predetermined set of user characteristic data samples. At least one reference gender corresponding to the at least one user characteristic data sample is obtained by querying a preset correspondence between user characteristic data samples and reference genders. Gender of the user is determined according to the at least one reference gender, and the gender of the user determined is sent to the mobile terminal.

According to a second aspect, a method for gender recognition of a user is provided in implementations. The method is performed by a mobile terminal and the method includes the following. User characteristic data is obtained, where the user characteristic data is indicative of usage of the mobile terminal by the user. The user characteristic data is sent to a server. Gender of the user determined by the server according to the user characteristic data is received.

According to a third aspect, a sever is provided in implementations. The sever includes a receiving module, a determining module, a querying module, and a processing module.

The receiving module is configured to receive user characteristic data from a mobile terminal, where the user characteristic data is indicative of usage of the mobile terminal by a user.

The determining module is configured to determine, from a predetermined set of user characteristic data samples, at least one user characteristic data sample matching the user characteristic data.

The querying module is configured to query a preset correspondence between user characteristic data samples and reference genders and obtain at least one reference gender corresponding to the at least one user characteristic data sample.

The processing module is configured to determine gender of the user according to the at least one reference gender and send the gender determined to the mobile terminal.

According to a fourth aspect, a mobile terminal is provided in implementations. The mobile terminal includes an obtaining module, a sending module, and a receiving module.

The obtaining module is configured to obtain user characteristic data, where the user characteristic data is indicative of usage of the mobile terminal by the user.

The sending module is configured to send the user characteristic data to a server.

The receiving module is configured to receive gender of the user determined by the server according to the user characteristic data.

According to a fifth aspect, a system for gender recognition of a user is provided. The system for gender recognition of a user includes the sever in the third aspect of the disclosure and the mobile terminal in the fourth aspect of the disclosure.

According to a sixth aspect, a sever is provided. The sever includes a processor, a memory, a communication interface, and one or more programs stored in the memory and configured to be executed by the processor. The one or more programs include instructions for performing the method in the first aspect of the disclosure.

According to a seventh aspect, a mobile terminal is provided. The mobile terminal includes a processor, a memory, a communication interface, and one or more programs stored in the memory and configured to be executed by the processor. The one or more programs include instructions for performing the method in the second aspect of the disclosure.

According to an eighth aspect, a computer readable storage medium is provided. The computer readable storage medium is configured to store computer programs for electronic data interchange. The computer programs, when executed by a computer, are operable with the computer to execute all or part of the operations described in the first or second aspect of the disclosure.

Hereinafter, implementations of the disclosure will be described in detail.

FIG. 1 is a schematic flow chart illustrating a method for gender recognition of a user according to implementations. As illustrated in FIG. 1, the method is performed by a sever and includes the following.

At S101, the sever receives user characteristic data from a mobile terminal, where the user characteristic data is indicative of usage of the mobile terminal by the user.

The server receives the user characteristic data from the mobile terminal, and the user characteristic data is indicative of the usage of the mobile terminal by the user. For example, the user characteristic data may include multiple characteristic data such as: the number of times and the length of time the user browses men's products (such as men's wear) in shopping applications; the number of times and the length of time the user browses women's products (such as cosmetics and women's wear) in shopping applications; the length of time the user reads men's novels; the length of time the user reads women's novels; the length of time the user reads sports news; the length of time the user reads constellation news; the number of times the user takes selfies with a front camera; the number of times the user uses beauty software; the number of times and the length of time the user plays games of different types, and the like, which are not limited herein.

At S102, the sever determines, from a predetermined set of user characteristic data samples, at least one user characteristic data sample matching the user characteristic data.

The predetermined set of user characteristic data samples is determined by the server. The server has a database for storing user characteristic data from other mobile terminals. Genders of users of these mobile terminals are known, while the gender of the user of the mobile terminal is unknown. The server can sample in the database to select multiple user characteristic data as samples to form the set of user characteristic data samples.

The server can determine, from the predetermined set of user characteristic data samples, the at least one user characteristic data sample matching the user characteristic data.

At S103, the sever queries a preset correspondence between user characteristic data samples and reference genders and obtains at least one reference gender corresponding to the at least one user characteristic data sample.

Since genders of users corresponding to user characteristic data in the server are known, the server can query the preset correspondence between user characteristic data samples and reference genders to obtain the at least one reference gender corresponding to the at least one user characteristic data sample.

At S104, the sever determines the gender of the user according to the at least one reference gender and sending the gender determined to the mobile terminal.

After obtaining the at least one reference gender, the mobile terminal can further determine the gender of the user of the mobile terminal and send gender information to the mobile terminal.

As can be seen, in implementations, the sever receives the user characteristic data from the mobile terminal, where the user characteristic data is indicative of usage of the mobile terminal by the user. Next, the sever determines the at least one user characteristic data sample matching the user characteristic data from the predetermined set of user characteristic data samples. Then, the sever queries the preset correspondence between user characteristic data samples and reference genders and obtains the at least one reference gender corresponding to the at least one user characteristic data sample. Finally, the sever determines the gender of the user according to the at least one reference gender, and sends the gender of the user determined to the mobile terminal. In this way, according to the user characteristic data of the mobile terminal and the predetermined set of user characteristic data samples, the server can determine the at least one reference gender, and then determine the gender of the user according to the at least one reference gender. As such, when the gender of the user of the mobile terminal is unknown, the gender of the user can be inferred accurately by collecting the user characteristic data.

As an implementation, the user characteristic data includes multiple characteristic data of the user. The method further includes normalizing each characteristic data in the user characteristic data and the predetermined set of user characteristic data samples.

The user characteristic data includes multiple characteristic data of the user, and a collection of the multiple characteristic data forms the user characteristic data. For example, the user characteristic data is $(x_1^0, x_2^0, \ldots, x_n^0)$, where $x_1^0$ represents the number of times and the length of time the user browses men's products (such as men's wear) in shopping applications, $x_2^0$ represents the number of times and the length of time the user browses women's products (such as cosmetics and women's wear) in shopping applications, $x_n^0$ represents the length of time the user reads sports news, n represents the number of characteristic data in the user characteristic data.

The server can perform normalization on the each characteristic data in the user characteristic data and the predetermined set of user characteristic data samples, so that the value of the each characteristic data is between 0 and 1. For example, in the user characteristic data, for the characteristic data $x_1^0$, which represents the number of times and the length of time the user browses men's products (such as men's wear) in shopping applications, the manner in which $x_1^0$ is normalized may include: obtaining values of all $x_1$ in the database of the server, using the value obtained by subtracting the minimum value from the maximum value as the denominator, and using the value obtained by subtracting the minimum value from $x_1^0$ as the numerator, so as to normalize $x_1^0$.

As can be seen, in implementations, the user characteristic data includes multiple characteristic data of the user. The user characteristic data and the user characteristic data samples are normalized to improve the simplicity of mathematical operations on the user characteristic data.

As an implementation, the at least one user characteristic data sample matching the user characteristic data is determined from the predetermined set of user characteristic data samples as follows.

Calculate a similarity value $y^i$ between the user characteristic data and the i-th user characteristic data sample in the predetermined set of user characteristic data samples according to the formula: $y^i=\sqrt{(x_1-x_1^0)^2+(x_2-x_2^0)^2+\ldots+(x_n-x_n^0)^2}$. $(x_1^0, x_2^0, \ldots, x_n^0)$ represents the user characteristic data, $(x_1, x_2, \ldots, x_n, y)$ represents the i-th user characteristic data sample in the user characteristic data sample set, n represents the number of characteristic data in the user characteristic data, and the smaller the similarity value y, the higher a similarity between the user characteristic data and the user characteristic data sample. Sort similarity values $y^i$'s (i.e., $y^1, y^2, y^3, \ldots y^i, \ldots y^k$, where there are k user characteristic data samples in the predetermined set of user characteristic data samples and k is equal to or greater than N) in ascending order, and select user characteristic data samples corresponding to the first N sorted similarity values (i.e., $y^1, y^2, y^3, \ldots y^N$) as the at least one user characteristic data sample that matches the user characteristic data, where N is an odd number.

The set of user characteristic data samples includes multiple user characteristic data samples. A Euclidean distance between the user characteristic data and each user characteristic data sample can be calculated as the similarity value y according to the formula. i represents any user characteristic data sample in the set of user characteristic data samples, and $y^i$ represents any similarity value among the multiple calculated similarity values.

Sort the multiple calculated similarity values $y^i$'s (i.e., $y^1, y^2, y^3, \ldots y^i, \ldots y^k$, where there are k user characteristic data samples in the predetermined set of user characteristic data samples and k is equal to or greater than N) in ascending order, and select user characteristic data samples corresponding to the first N sorted similarity values (i.e., $y^1, y^2, y^3, \ldots y^N$) as the at least one user characteristic data sample that matches the user characteristic data, where N is an odd number.

As can be seen, in implementations, the similarity values between the user characteristic data and the user characteristic data samples are calculated according to the formula: $y^i=\sqrt{(x_1-x_1^0)^2+(x_2-x_2^0)^2+\ldots+(x_n-x_n^0)^2}$, so that the user characteristic data samples with high similarity with the user characteristic data can be determined, which is helpful to improve reliability of gender recognition of the user.

As an implementation, determine the gender of the user according to the at least one reference gender as follows. Determine a reference gender with a larger proportion among the at least one reference gender as the gender of the user.

According to the at least one reference gender corresponding to the at least one user characteristic data sample, the gender of the user of the mobile terminal can be determined. For example, there are 9 reference genders, of which 6 reference genders are male and 3 reference genders are female, it indicates that the gender of the user of the mobile terminal is most likely to be male.

As can be seen, in implementations, in the at least one reference gender, the reference gender with a larger number of occurrences is selected as the gender of the user, which is beneficial to improving accuracy of the gender recognition of the user.

As an implementation, the method further includes the following. Update information of user characteristic data of multiple mobile terminals is obtained from a database. Multiple user characteristic data whose update time is within a preset period of time is selected to form the set of user characteristic data samples.

User characteristic data from multiple mobile terminals are stored in the database of the sever, and multiple user characteristic data samples can be obtained. Obtain the update information of the user characteristic data, and select user characteristic data whose update time is within the preset period of time as the set of user characteristic data samples. For example, the server can select, from the database, multiple user characteristic data whose update time is within one week as the set of user characteristic data samples.

As can be seen, in implementations, the server selects multiple user characteristic data in the database whose update time is within the preset period of time as the set of user characteristic data samples, which is beneficial to improving accuracy of the gender recognition of the user.

Figure 2:
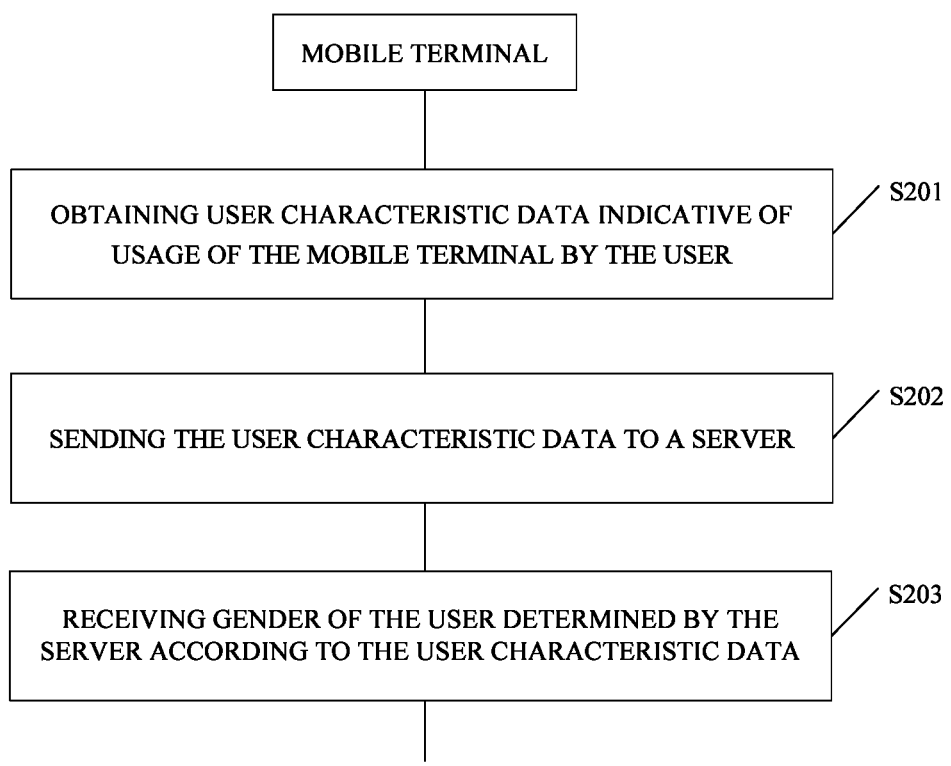
FIG. 2 is a schematic flow chart illustrating a method for gender recognition of a user according to other implementations.

FIG. 2 is a schematic flow chart illustrating a method for gender recognition of a user according to implementations. As illustrated in FIG. 2, the method is performed by a mobile terminal and includes the following.

At 201, the mobile terminal obtains user characteristic data, where the user characteristic data is indicative of usage of the mobile terminal by the user.

At 202, the mobile terminal sends the user characteristic data to a server.

At 203, the mobile terminal receives gender of the user determined by the server according to the user characteristic data.

As can be seen, in implementations, the mobile terminal obtains the user characteristic data, where the user characteristic data is indicative of usage of the mobile terminal by the user. Then the mobile terminal sends the user characteristic data to the server. At last, the mobile terminal receives the gender of the user determined by the server according to the user characteristic data. As such, when the gender of the user of the mobile terminal is unknown, the gender of the user can be inferred accurately by collecting the user characteristic data.

As an implementation, the user characteristic data includes multiple characteristic data, and the multiple characteristic data is associated with the gender of the user of the mobile terminal.

Multiple characteristic data in the user characteristic data is associated with the gender of the user of the mobile terminal. For example, the characteristic data may include: the number of times and the length of time the user browses men's products (such as men's wear) in shopping applications; the number of times and the length of time the user browses women's products (such as cosmetics and women's wear) in shopping applications; the length of time the user reads men's novels; the length of time the user reads women's novels; the length of time the user reads sports news; the length of time the user reads constellation news; the number of times the user takes selfies with a front camera; the number of times the user uses beauty software; the number of times and the user browses the user plays games of different types, and the like, which are not limited herein.

As can be seen, in implementations, the multiple characteristic data in the user characteristic data is associated with the gender of the user, and the multiple characteristic data involves some habit-related parameters of using the mobile terminal by men or women, therefore, user characteristic data can be used as a basis for determining the gender of the user.

As an implementation, the method further includes the following before obtaining the user characteristic data. The mobile terminal obtains user identity information stored in the mobile terminal. When the gender information of the user is not included in the user identity information, the mobile terminal obtains the user characteristic data.

Since not all users of mobile terminals will provide their own gender information when registering user accounts or binding mobile terminals, the gender of the user is unknown for the mobile terminal. When the mobile terminal detects that the gender information of the user is not included in the user identity information, the mobile terminal can obtain the user characteristic data and send the user characteristic data to the server. The server analyzes user's behavior and habits of using the mobile terminal according to the user characteristic data, and determines the gender of the user of the mobile terminal.

As can be seen, in implementations, when the mobile terminal detects that the gender of the user is unknown, the mobile terminal collects the user characteristic data and sends the user characteristic data to the server, which is beneficial for the server to recognize the gender of the user based on the user characteristic data.

Figure 3:
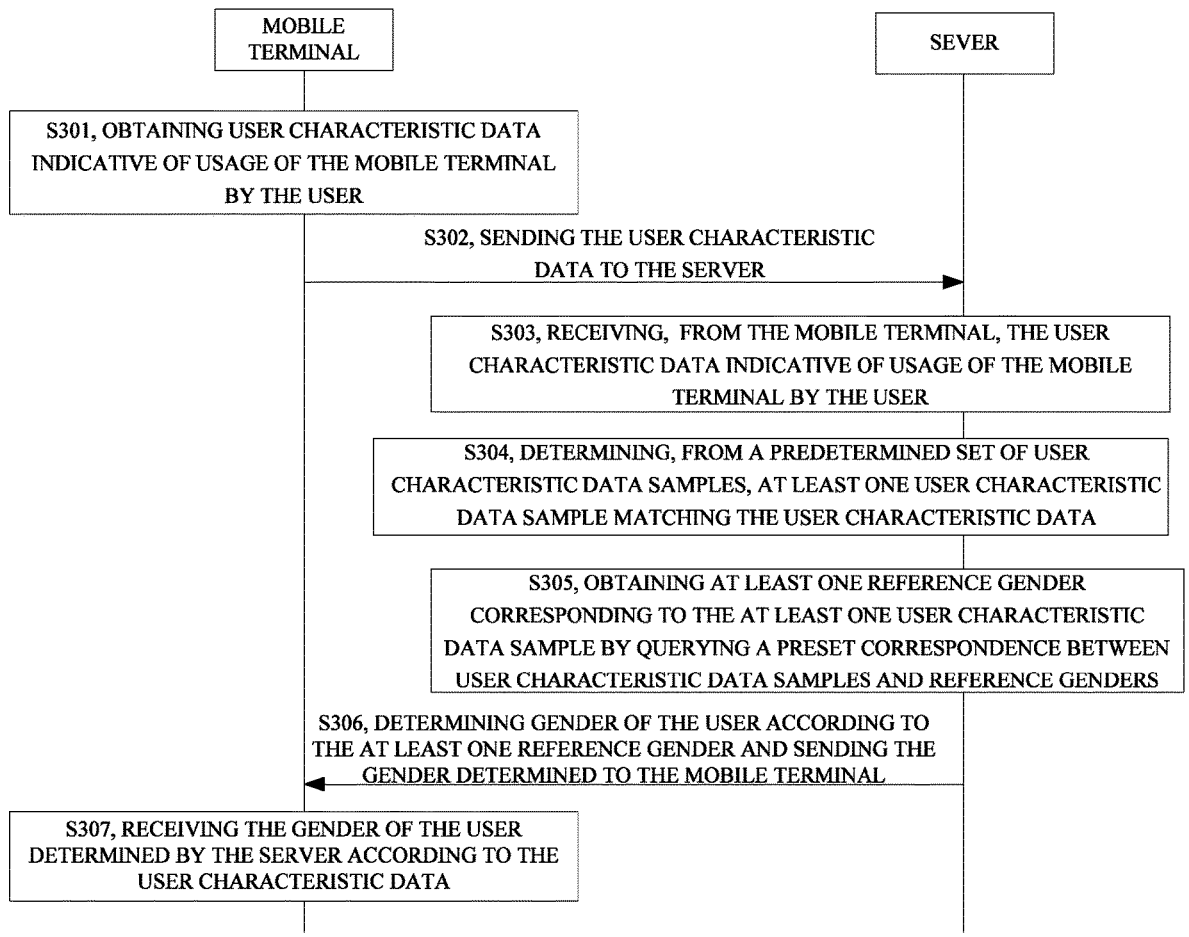
FIG. 3 is a schematic flow chart illustrating a method for gender recognition of a user according to other implementations.

FIG. 3 is a schematic flow chart illustrating a method for gender recognition of a user according to implementations. As illustrated in FIG. 3, the method is performed by a sever and a mobile terminal, and the method includes the following.

At S301, the mobile terminal obtains user characteristic data, where the user characteristic data is indicative of usage of the mobile terminal by the user.

At S302, the mobile terminal sends the user characteristic data to the server.

At S303, the sever receives user characteristic data from the mobile terminal, where the user characteristic data is indicative of usage of the mobile terminal by the user.

At S304, the sever determines, from a predetermined set of user characteristic data samples, at least one user characteristic data sample matching the user characteristic data.

At S305, the sever queries a preset correspondence between user characteristic data samples and reference genders and obtains at least one reference gender corresponding to the at least one user characteristic data sample.

At S306, the sever determines gender of the user according to the at least one reference gender and sends the gender determined to the mobile terminal.

At S307, the mobile terminal receives the gender of the user determined by the server according to the user characteristic data.

As can be seen, in implementations, the mobile terminal obtains the user characteristic data, where the user characteristic data is indicative of usage of the mobile terminal by the user. The mobile terminal sends the user characteristic data to the server. The sever receives the user characteristic data from the mobile terminal. Next, the sever determines the at least one user characteristic data sample matching the user characteristic data from the predetermined set of user characteristic data samples. Then, the sever queries the preset correspondence between user characteristic data samples and reference genders and obtains the at least one reference gender corresponding to the at least one user characteristic data sample. Finally, the sever determines the gender of the user according to the at least one reference gender, and sends the gender of the user determined to the mobile terminal. In this way, according to the user characteristic data of the mobile terminal and the predetermined set of user characteristic data samples, the server can determine the at least one reference gender, and then determine the gender of the user according to the at least one reference gender. As such, when the gender of the user of the mobile terminal is unknown, the gender of the user can be inferred accurately by collecting the user characteristic data.

Figure 4:
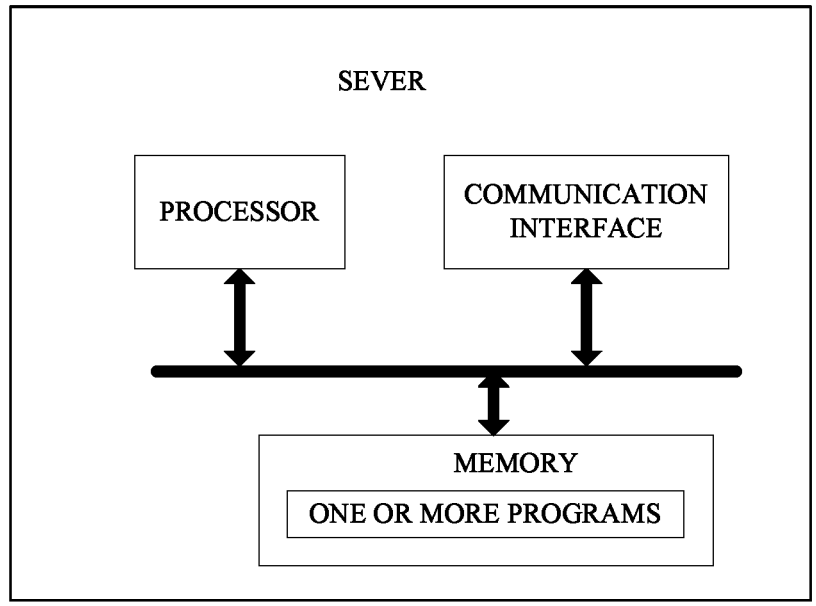
FIG. 4 is a schematic structural diagram illustrating a sever according to implementations.

In view of implementations illustrated in FIG. 1, FIG. 2, and FIG. 3, reference can be made to FIG. 4. FIG. 4 is a schematic structural diagram illustrating a sever according to implementations. As illustrated in FIG. 4, the sever includes a processor, a memory, a communication interface, and one or more programs stored in the memory and configured to be executed by the processor, the one or more programs include instructions for performing the following.

User characteristic data is received from a mobile terminal, where the user characteristic data is indicative of usage of the mobile terminal by the user. At least one user characteristic data sample matching the user characteristic data is determined from a predetermined set of user characteristic data samples. At least one reference gender corresponding to the at least one user characteristic data sample is obtained by querying a preset correspondence between user characteristic data samples and reference genders. Gender of the user is determined according to the at least one reference gender, and the gender determined is sent to the mobile terminal.

As can be seen, in implementations, the sever receives the user characteristic data from the mobile terminal, where the user characteristic data is indicative of usage of the mobile terminal by the user. Next, the sever determines the at least one user characteristic data sample matching the user characteristic data from the predetermined set of user characteristic data samples. Then, the sever queries the preset correspondence between user characteristic data samples and reference genders and obtains the at least one reference gender corresponding to the at least one user characteristic data sample. Finally, the sever determines the gender of the user according to the at least one reference gender, and sends the gender of the user determined to the mobile terminal. In this way, according to the user characteristic data of the mobile terminal and the predetermined set of user characteristic data samples, the server can determine the at least one reference gender, and then determine the gender of the user according to the at least one reference gender. As such, when the gender of the user of the mobile terminal is unknown, the gender of the user can be inferred accurately by collecting the user characteristic data.

As an implementation, the user characteristic data includes multiple characteristic data. The one or more programs include instructions for performing the following. Each characteristic data in the user characteristic data and the predetermined set of user characteristic data samples is normalized.

As an implementation, in terms of determining, from the predetermined set of user characteristic data samples, the at least one user characteristic data sample matching the user characteristic data, the one or more programs include instructions for performing the following.

A similarity value $y^i$ between the user characteristic data and the i-th user characteristic data sample in the predetermined set of user characteristic data samples is calculated according to the following formula: $y^i = \sqrt{(x_1-x_1^0)^2+(x_2-x_2^0)^2+...+(x_n-x_n^0)^2}$, where $(x_1^0, x_2^0, \ldots, x_n^0)$ represents the user characteristic data, $(x_1, x_2, \ldots, x_n, y)$ represents the i-th user characteristic data sample in the user characteristic data sample set, n represents the number of characteristic data in the user characteristic data, and the smaller the similarity value y, the higher a similarity between the user characteristic data and the user characteristic data sample. Similarity values $y^i$'s (i.e., $y^1, y^2, y^3, \ldots y^i, \ldots y^k$, where there are k user characteristic data samples in the predetermined set of user characteristic data samples and k is equal to or greater than N) are sorted in ascending order, and user characteristic data samples corresponding to the first N sorted similarity values (i.e., $y^1, y^2, y^3, \ldots y^N$) are selected as the at least one user characteristic data sample that matches the user characteristic data, where N is an odd number.

As an implementation, in terms of determining the gender of the user according to the at least one reference gender, the one or more programs include instructions for determining a reference gender with a larger proportion among the at least one reference gender as the gender of the user.

As an implementation, the one or more programs further include instructions for performing the following. Update information of user characteristic data of multiple mobile terminals is obtained from a database. Multiple user characteristic data whose update time is within a preset period of time is selected to form the set of user characteristic data samples.

Figure 5:
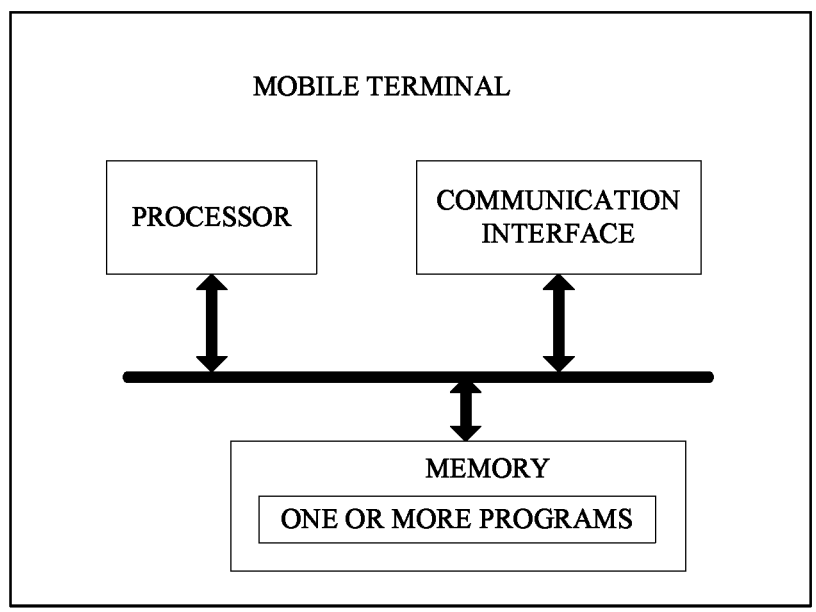
FIG. 5 is a schematic structural diagram illustrating a mobile terminal according to implementations.

In view of implementations illustrated in FIG. 1, FIG. 2, and FIG. 3, reference can be made to FIG. 5. FIG. 5 is a schematic structural diagram illustrating a mobile terminal according to implementations. One or more application programs and an operating system run in the mobile terminal. As illustrated in FIG. 5, the mobile terminal includes a processor, a memory, a communication interface, and one or more programs. The one or more programs are different from the one or more application programs. The one or more programs are stored in the memory and configured to be executed by the processor, and the one or more programs include instructions for performing the following.

User characteristic data is obtained, where the user characteristic data is indicative of usage of the mobile terminal by the user. The user characteristic data is sent to a server. Gender of the user determined by the server according to the user characteristic data is received.

As can be seen, in implementations, the mobile terminal obtains the user characteristic data, where the user characteristic data is indicative of usage of the mobile terminal by the user. Then the mobile terminal sends the user characteristic data to the server. At last, the mobile terminal receives the gender of the user determined by the server according to the user characteristic data. In this way, according to the user characteristic data of the mobile terminal and the predetermined set of user characteristic data samples, the server can determine the at least one reference gender, and then determine the gender of the user according to the at least one reference gender. As such, when the gender of the user of the mobile terminal is unknown, the gender of the user can be inferred accurately by collecting the user characteristic data.

As an implementation, the user characteristic data includes multiple characteristic data, and the multiple characteristic data is associated with the gender of the user of the mobile terminal.

As an implementation, the one or more programs include instructions for performing the following. Obtain user identity information stored in the mobile terminal before obtaining the user characteristic data. Obtain the user characteristic data when the gender information of the user is not included in the user identity information.

The foregoing solution of the implementations of the disclosure is mainly described from the viewpoint of execution process of the method. It can be understood that, in order to implement the above functions, the mobile terminal and the sever include hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 6:
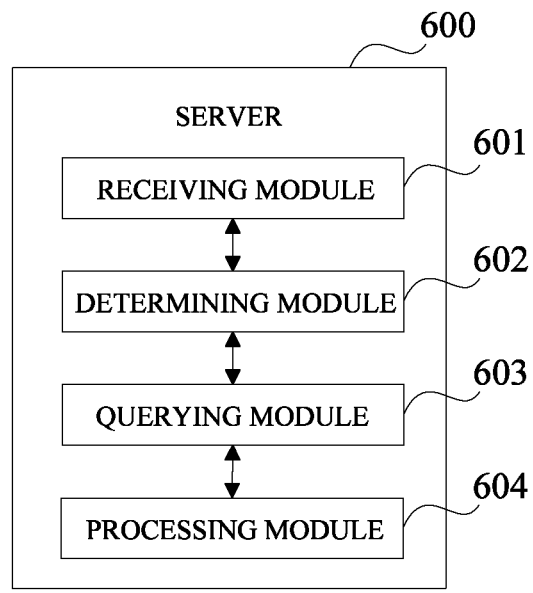
FIG. 6 is a block diagram illustrating a sever according to implementations.

In the case of the integrated unit, FIG. 6 is a block diagram illustrating a sever according to implementations. An operating system and one or more application programs are executed by the sever. The server 600 includes a receiving module 601, a determining module 602, a querying module 603, and a processing module 604.

The receiving module 601 is configured to receive user characteristic data from a mobile terminal, where the user characteristic data is indicative of usage of the mobile terminal by a user.

The determining module 602 is configured to determine, from a predetermined set of user characteristic data samples, at least one user characteristic data sample matching the user characteristic data.

The querying module 603 is configured to query a preset correspondence between user characteristic data samples and reference genders and obtain at least one reference gender corresponding to the at least one user characteristic data sample.

The processing module 604 is configured to determine gender of the user according to the at least one reference gender and send the gender determined to the mobile terminal.

As an implementation, the processing module 604 is further configured to normalize each characteristic data in the user characteristic data and the predetermined set of user characteristic data samples.

As an implementation, in terms of determining, from the predetermined set of user characteristic data samples, the at least one user characteristic data sample matching the user characteristic data, the determining module 602 is configured to: calculate a similarity value $y^i$ between the user characteristic data and the i-th user characteristic data sample in the predetermined set of user characteristic data samples according to the following formula: $y^i = \sqrt{(x_1-x_1^0)^2+(x_2-x_2^0)^2+...+(x_n-x_n^0)^2}$ sort similarity values $y^i$'s (i.e., $y^1, y^2, y^3, \ldots y^i, \ldots y^k$, where there are k user characteristic data samples in the predetermined set of user characteristic data samples and k is equal to or greater than N) in ascending order, and select user characteristic data samples corresponding to the first N sorted similarity values (i.e., $y^1, y^2, y^3, \ldots y^N$) as the at least one user characteristic data sample that matches the user characteristic data, where N is an odd number. $(x_1^0, x_2^0, \ldots, x_n^0)$ represents the user characteristic data, $(x_1, x_2, \ldots, x_n, y)$ represents the i-th user characteristic data sample in the user characteristic data sample set, n represents the number of characteristic data in the user characteristic data, and the smaller the similarity value $y^i$, the higher a similarity between the user characteristic data and the user characteristic data sample.

As an implementation, in terms of determining the gender of the user according to the at least one reference gender, the processing module 606 is configured to determine a reference gender with a larger proportion among the at least one reference gender as the gender of the user.

As an implementation, the processing module 604 is further configured to obtain, from a database, update information of user characteristic data of multiple mobile terminals; select multiple user characteristic data whose update time is within a preset period of time to form the set of user characteristic data samples.

It is to be noted that, the sever described in the device implementation of the disclosure is presented in the form of functional units. The term "module" used herein should be understood as the broadest meaning as possible, and an object for implementing functions defined by each "module" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

According to the implementations of the disclosure, functional modules may be divided for the sever in accordance with the foregoing method examples. For example, each functional module may be divided according to each function, and two or more functions may be integrated in one processing module. The above-mentioned integrated module can be implemented in the form of hardware or software functional modules. It should be noted that the division of modules in implementations of the present disclosure is schematic, and is merely a logical function division, and there may be other division manners in actual implementation.

Figure 7:
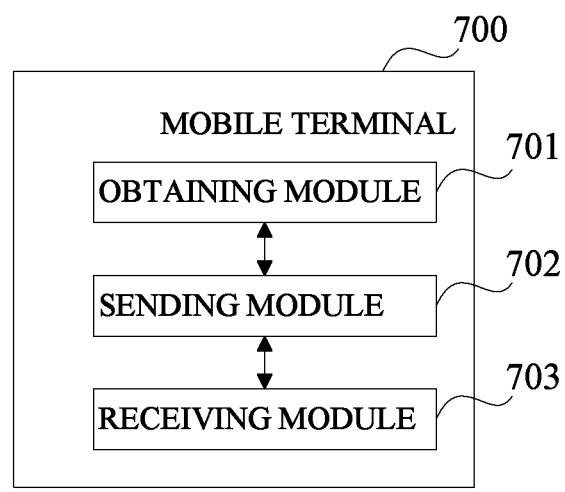
FIG. 7 is a block diagram illustrating a mobile terminal according to implementations.

In the case of the integrated unit, FIG. 7 is a block diagram illustrating a mobile terminal according to implementations. An operating system and one or more application programs are executed by the mobile terminal. The mobile terminal 700 includes an obtaining module 701, a sending module 702, and a receiving module 703.

The obtaining module 701 is configured to obtain user characteristic data, where the user characteristic data is indicative of usage of the mobile terminal by the user.

The sending module 702 is configured to send the user characteristic data to a server.

The receiving module 703 is configured to receive gender of the user determined by the server according to the user characteristic data.

As an implementation, the user characteristic data includes multiple characteristic data, and the multiple characteristic data is associated with the gender of the user of the mobile terminal.

As an implementation, the obtaining module 701 is further configured to obtain user identity information stored in the mobile terminal before obtaining the user characteristic data; obtain the user characteristic data when the gender information of the user is not included in the user identity information.

It is to be noted that, the mobile terminal described in the device implementation of the disclosure is presented in the form of functional modules. The term "module" used herein should be understood as the broadest meaning as possible, and an object for implementing functions defined by each "module" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Figure 8:
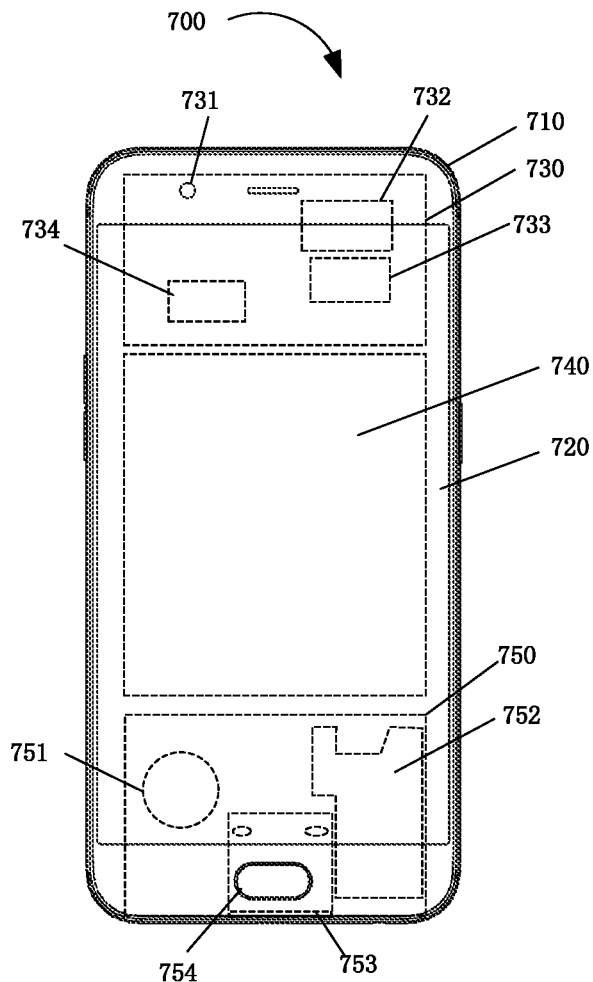
FIG. 8 is a schematic structural diagram illustrating a smart phone according to implementations.

FIG. 8 is a schematic structural diagram illustrating a smart phone according to implementations. The smart phone 700 includes: a housing 710, a touch display screen 720, a main board 730, a battery 740, and a sub-board 750. The main board 730 is provided with a front camera 731, a processor 732, a memory 733, a power management chip 734, and the like. The sub board is provided with an oscillator 751, an integrated sound cavity 752, a VOOC flash charging interface 753, and a fingerprint recognition module 754.

The smart phone 700 can obtain user characteristic data which is indicative of usage of the mobile terminal by the user; send the user characteristic data to a server, and receive gender of the user determined by the server according to the user characteristic data.

The processor 732 is a control center of the smart phone and is configured to connect each part of the smart phone via various interfaces and lines. By running or executing software programs and/or modules stored in the memory 733 and calling data stored in the memory 733, the processor 134 can perform various functions of the smart phone and process data, so as to achieve overall monitoring of the smart phone. In an implementation, the processor 732 can include one or more processing units. In an implementation, the processor 732 can be integrated with an application processor and a modem processor. The application processor is mainly configured to process an operating system(s), a user interface(s), an application(s), and the like. The modem processor is mainly configured to process wireless communication. It can be understood that the modem processor may not be integrated into the processor 732 as well. The processor 732 may be, for example, a central processing unit (CPU), a general-purpose processor, a digital signal processor (DSP), an application-specific integrated circuit (ASIC), and a field programmable gate array (FPGA), or other programmable logic devices, transistor logic devices, hardware components, or any combination thereof. Various example logical blocks, modules, and circuits described in conjunction with the disclosure may be achieved or implemented by the processor 134. The processor can also be a combination of computing functions, for example, a combination containing one or more micro-processors, a combination of a DSP and a micro-processor, and the like.

The memory 733 is configured to store software programs and modules. The processor 732 is configured to perform various functions of the smart phone and process data by running or executing software programs and/or modules stored in the memory 733. The memory 733 can manly include a program storage area and a data storage area. The program storage area is configured to store the operating system, applications required by at least one function, and the like. The data storage area is configured to store data created according to use of the smart phone and the like. In addition, the memory 733 may include a high-speed random access memory, and can further include a non-volatile memory, such as at least one magnetic disk memory, a flash memory, or other volatile solid-state memories. The memory 733 can be, for example, a random access memory (RAM), a flash memory, a read only memory (ROM), an erasable programmable ROM (EPROM), an electrically EPROM (EEPROM), a register, a hard disk, a mobile hard disk, a compact disc read-only memory (CD-ROM), or any other forms of storage medium known in the art.

Implementations further provide a computer readable storage medium. The computer readable storage medium is configured to store computer programs for electronic data interchange. The computer programs are operable with a computer to execute part of or all the operations of any of the methods for gender recognition of a user described in the above method implementations. The computer includes the mobile terminal.

Implementations further provide a computer program product. The computer program product includes a non-transitory computer readable storage medium that stores computer programs. The computer programs are operable with a computer to execute part of or all the operations of any of the methods for gender recognition of a user described in the above method implementations. The computer programs can be a software installation package. The computer includes the mobile terminal.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are example implementations and the actions and modules involved are not necessarily essential to the present disclosure.

In the foregoing implementations, the description of each implementation has its own emphasis. For the parts not described in detail in one implementation, reference may be made to related descriptions in other implementations.

In implementations of the disclosure, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software program module.

The integrated unit may be stored in a computer-readable memory when it is implemented in the form of a software program module and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skilled in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for gender recognition of a user by a sever, the method comprising:
    receiving, from a mobile terminal, user characteristic data indicative of usage of the mobile terminal by a user, wherein the user characteristic data comprises a plurality of characteristic data;
    normalizing each characteristic data in the user characteristic data and a predetermined set of user characteristic data samples, which comprises:
        for each of the plurality of characteristic data $x_i^0$, obtaining values of all $x_i$ in a database of a server, using the value obtained by subtracting a minimum value of the values of all $x_i$ from a maximum value of the values of all $x_i$ as a denominator, and using the value obtained by subtracting the minimum value of the values of all $x_i$ from $x_i^0$ as a numerator, so as to normalize $x_i^0$, $1 \leq i \leq n$;
    determining, from a predetermined set of user characteristic data samples, at least one user characteristic data sample matching the user characteristic data, which comprises:
        determining a similarity value $y^i$ between the user characteristic data and an i-th user characteristic data sample in the predetermined set of user characteristic data samples according to the following formula: $y^i = \sqrt{(x_1 - x_1^0)^2 + (x_2 - x_2^0)^2 + \ldots + (x_n - x_n^0)^2}$, wherein $(x_1^0, x_2^0, \ldots, x_n^0)$ represents the user characteristic data, $(x_1, x_2, \ldots, x_n)$ represents the i-th user characteristic data sample in the user characteristic data sample set, n represents the number of characteristic data in the user characteristic data, and wherein the smaller the similarity value $y^i$, the higher a similarity between the user characteristic data and the user characteristic data sample; and
        sorting similarity values $y^i$'s in ascending order, and selecting user characteristic data samples corresponding to the first N sorted similarity values as the at least one user characteristic data sample matching the user characteristic data, wherein N is an odd number;
    obtaining at least one reference gender corresponding to the at least one user characteristic data sample by querying a preset correspondence between user characteristic data samples and reference genders; and
    determining gender of the user according to the at least one reference gender and sending the gender determined to the mobile terminal.

2. The method of claim 1, wherein determining the gender of the user according to the at least one reference gender comprises:
    determining a reference gender with a larger proportion among the at least one reference gender as the gender of the user.

3. The method of claim 1, further comprising:
    obtaining, from a database, update information of user characteristic data of a plurality of mobile terminals; and
    selecting a plurality of user characteristic data each having an update time within a preset period of time to form the set of user characteristic data samples.

4. A server, comprising:
    at least one processor; and
    a non-transitory computer readable storage, coupled to the at least one processor and storing at least one computer executable instruction thereon which, when executed by the at least one processor, causes the at least one processor to:
        receive, from a mobile terminal, user characteristic data indicative of usage of the mobile terminal by a user, wherein the user characteristic data comprises a plurality of characteristic data;
        normalize each characteristic data in the user characteristic data and a predetermined set of user characteristic data samples;
        determine, from a predetermined set of user characteristic data samples, at least one user characteristic data sample matching the user characteristic data;
        obtain at least one reference gender corresponding to the at least one user characteristic data sample by querying a preset correspondence between user characteristic data samples and reference genders; and
        determine gender of the user according to the at least one reference gender and sending the gender determined to the mobile terminal,
    wherein the at least one processor caused to normalize each characteristic data in the user characteristic data and the predetermined set of user characteristic data samples is caused to:
        for each of the plurality of characteristic data $x_i^0$, obtain values of all $x_i$ in a database of a server, use the value obtained by subtracting a minimum value of the values of all $x_i$ from a maximum value of the values of all $x_i$ as a denominator, and use the value obtained by subtracting the minimum value of the values of all $x_i$ from $x_i^0$ as a numerator, so as to normalize $x_i^0$, $1 \leq i \leq n$;
    wherein the at least one processor caused to determine, from the predetermined set of user characteristic data samples, the at least one user characteristic data sample matching the user characteristic data is caused to:
        determine a similarity value $y^i$ between the user characteristic data and an i-th user characteristic data sample in the predetermined set of user characteristic data samples according to the following formula:

$y^i=\sqrt{(x_1-x_1^0)^2+(x_2-x_2^0)^2+...+(x_n-x_n^0)^2}$, wherein $(x_1^0, x_2^0, \ldots, x_n^0)$ represents the user characteristic data, $(x_1, x_2, \ldots, x_n)$ represents the i-th user characteristic data sample in the user characteristic data sample set, n represents the number of characteristic data in the user characteristic data, and wherein the smaller the similarity value $y^i$, the higher a similarity between the user characteristic data and the user characteristic data sample; and sort similarity values $y^i$'s in ascending order, and select user characteristic data samples corresponding to the first N sorted similarity values as the at least one user characteristic data sample matching the user characteristic data, wherein N is an odd number.

5. The server of claim 4, wherein the at least one processor configured to determine the gender of the user according to the at least one reference gender is configured to:

determine a reference gender with a larger proportion among the at least one reference gender as the gender of the user.

6. The server of claim 4, wherein the at least one processor is further configured to:

obtain, from a database, update information of user characteristic data of a plurality of mobile terminals; and select a plurality of user characteristic data whose update time is within a preset period of time to form the set of user characteristic data samples.

7. A non-transitory computer readable storage medium storing a computer program which, when executed by a processor, causes the processor to:

receive user characteristic data from a mobile terminal, the user characteristic data being indicative of usage of the mobile terminal by the user;

normalize each characteristic data in the user characteristic data and the predetermined set of user characteristic data samples;

determine, from a predetermined set of user characteristic data samples, at least one user characteristic data sample matching the user characteristic data;

obtain at least one reference gender corresponding to the at least one user characteristic data sample by querying a preset correspondence between user characteristic data samples and reference genders; and determine gender of the user according to the at least one reference gender and sending the gender determined to the mobile terminal, wherein the computer program executed by the processor to normalize each characteristic data in the user characteristic data and the predetermined set of user characteristic data samples is executed by the processor to:

for each of the plurality of characteristic data $x_i^0$, obtain values of all $x_i$ in a database of a server, use the value obtained by subtracting a minimum value of the values of all $x_i$ from a maximum value of the values of all $x_i$ as a denominator, and use the value obtained by subtracting the minimum value of the values of all $x_i$ from $x_i^0$ as a numerator, so as to normalize $x_i^0$, $1 \leq i \leq n$;

wherein the computer program executed by the processor to determine, from the predetermined set of user characteristic data samples, the at least one user characteristic data sample matching the user characteristic data is executed by the processor to:

determine a similarity value $y^i$ between the user characteristic data and an i-th user characteristic data sample in the predetermined set of user characteristic data samples according to the following formula:

$y^i=\sqrt{(x_1-x_1^0)^2+(x_2-x_2^0)^2+...+(x_n-x_n^0)^2}$, wherein $(x_1^0, x_2^0, \ldots, x_n^0)$ represents the user characteristic data, $(x_1, x_2, \ldots, x_n)$ represents the i-th user characteristic data sample in the user characteristic data sample set, n represents the number of characteristic data in the user characteristic data, and wherein the smaller the similarity value $y^i$, the higher a similarity between the user characteristic data and the user characteristic data sample; and sort similarity values $y^i$'s in ascending order, and select user characteristic data samples corresponding to the first N sorted similarity values as the at least one user characteristic data sample matching the user characteristic data, wherein N is an odd number.

8. The non-transitory computer readable storage medium of claim 7, wherein the computer program executed by the processor to determine the gender of the user according to the at least one reference gender is executed by the processor to:

determine a reference gender with a larger proportion among the at least one reference gender as the gender of the user.

9. The non-transitory computer readable storage medium of claim 7, wherein the computer program, when executed by the processor, further causes the processor to:

obtain, from a database, update information of user characteristic data of a plurality of mobile terminals; and select a plurality of user characteristic data each having an update time is within a preset period of time to form the set of user characteristic data samples.

* * * * *